Aug. 17, 1937.   H. WENDEBORN   2,090,363
PROCESS FOR THE PRODUCTION OF CEMENT
Filed March 30, 1934
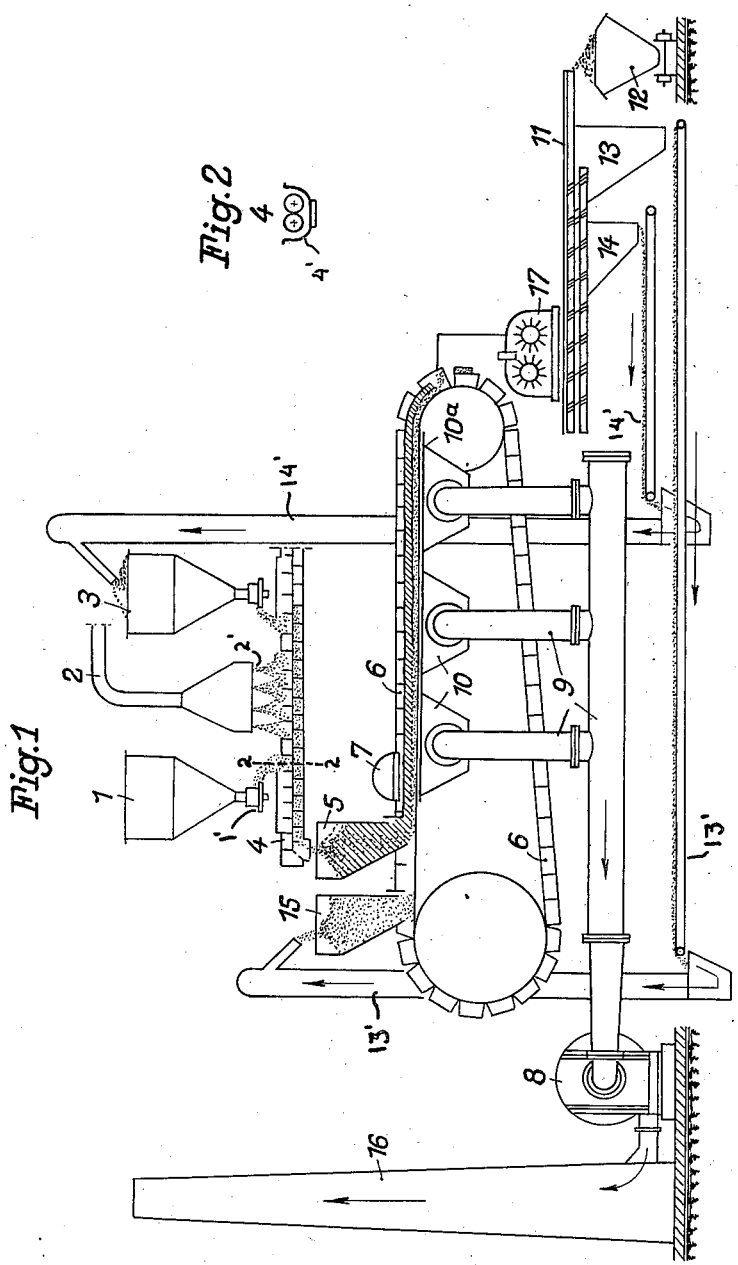
Inventor:
HELMUT WENDEBORN
By
   a. h. Deller
       Attorney Patented Aug. 17, 1937

2,090,363

UNITED STATES PATENT OFFICE 2,090,363

PROCESS FOR THE PRODUCTION OF CEMENT

Helmut Wendeborn, Frankfort-on-the-Main, Germany, assignor to American Lurgi Corporation, New York, N. Y., a corporation of New York Application March 30, 1934, Serial No. 718,145
In Germany April 4, 1933

6 Claims. (Cl. 106—25)

The present invention relates to a process for the production of cement.

In the manufacture of Portland cements and aluminous (puzzolanic) cements, it is well-known to employ either stationary or traveling grates carrying a charge of raw materials mixed with fuel which charge is first ignited and then sintered by causing an oxidizing blast and particularly an air blast to pass therethrough, either by suction or by pressure. In order to obtain a reasonably uniform and well-burned product, the operation of burning is repeated on the blast grate, that is to say, the product obtained by the first burning operation is comminuted to an appropriate grain size, mixed with fuel, and again treated on the blast grate. It has also been proposed to add to the charge of raw materials and fuel intended for the blast grate, substantial amounts (for instance from 40 to 100 per cent by weight) of burnt material reduced for instance to grain sizes below 10 millimeters. It is likewise well-known to take a mixture of raw materials for cement manufacture with about 40% of fine previously sintered material and first sinter this mixture of a Dwight-Lloyd apparatus, the mixture then being burned to completion upon a burning furnace at temperatures ranging from 1200° centigrade and over. Although many proposals have been made, none, as far as I am aware, has been wholly satisfactory and acceptable in industrial operation.

It is an object of the invention to provide a process for the production of cement involving the mixing of raw cement materials, returned sintered material, and fuel in the presence of water until there is produced for a traveling blast grate a granular charge which during the blast treatment exhibits a form from granular to lumpy and sinters uniformly in all its portions.

It is a further object of the invention to provide a process for the production of cement involving the mixing of raw cement materials, returned sintered material, and fuel in such a manner as to produce for a traveling blast grate a granular charge which contains less than about 15% of moisture, and during the blast treatment exhibits a form from granular to lumpy and sinters uniformly in all its portions.

It is another object of the invention to provide a process for the production of cement involving the mixing of about one part by weight of raw cement materials, from about 0.8 to about 3 parts by weight of returned sintered material, and from about 0.08 to about 0.18 part of fuel to produce for the blast grate a granular charge having less than about 15% but more than about 6% of moisture.

It is another object of the invention to provide a process for the mixing of raw cement materials, involving the grinding in wet mills of the raw material, either part or the whole of it, by adding such an amount of water that the sludge introduced into the charge approximately covers the water required to bring the charge prepared for the sintering machine to the moisture content that is suitable for a good sintering process.

It is also within the contemplation of the invention to provide a process for the production of Portland cement involving the mixing of finely comminuted raw cement materials, returned sintered material, fuel, and water to produce a granular mixture in such a manner that for each part by weight of raw materials there will be about 1.6 to about 2.5 parts by weight of returned material and about 0.1 to about 0.15 part by weight of fuel, the said returned sintered material being in grains of less than about 5 millimeters and the fuel in grains of less than about 3 millimeters, placing this granular mixture on a grate, igniting and sintering said mixture by blast actions, removing the sintered product, and comminuting said sintered product to such an extent as to produce large-piece clinkers for the manufacture of Portland cement and an amount of treated material required to be returned to the process.

Other objects and advantages of the invention will become apparent from the following description taken in conjunction with the accompanying drawing, in which:—

Fig. 1 is a diagrammatic side elevational view, partly in section of an apparatus capable of carrying the present invention into practice; and Fig. 2 is a detail cross-section view of a feeding and mixing mechanism of the apparatus taken on the line 2—2 of Fig. 1.

Cement burning processes carried out upon a blast grate have a good thermic efficiency only when the composition of the charge fulfills certain conditions to be set forth below. This will be understood upon considering that on the blast grate, the fuel is consumed within the charge. It is also required that the zone in which such combustion occurs and the sintering of the original raw materials takes place, to produce cement, should constitute but a fraction of the entire depth of the charge. This zone travels gradually, as the fuel is consumed progressively from the layers adjoining the ignited surface, such zone shifting gradually from the ignited surface of the charge to the opposite boundary layer at which the gases issue after their passage through the charge, for instance, under the influence of suction. These gases are strongly preheated by the portions of the charge lying below the combustion zone and the combustion gases give up a large part of their heat to preheat the charge. As a result of this, the combustion gases, at the beginning of the blast treatment, issue from the charge with a temperature of about from about 40 to 60° centigrade and only toward the end of such treatment attain a higher temperature which, however, generally does not exceed 200° centigrade, especially if, when the blast treatment is performed under suction, the blast grate is covered with a layer or lining of small size pieces of completely burned clinker (grate lining). Thus, only a small portion of the waste gases (off gases) has a temperature of about 200° centigrade. The heat contained in this portion of the waste gases may, if desired, be utilized for instance to preheat the combustion air for the ignition furnace or to preheat the charge, or for other purposes.

The completely burned clinker layer which forms at the ignited surface of the charge a short time after ignition and increases in thickness gradually, during the further progress of the operation serves to preheat the combustion air, so that even a short while after said ignition such air will enter the combustion zone proper with a rather high temperature. In this manner, temperatures of from about 1400 to 1700° centigrade can be obtained readily in the combustion zone when the mixture is burned on the blast grate. Combustion will therefore proceed rapidly, at high temperatures. The clinker has been cooled considerably by the time it leaves the traveling grate, and the average temperature of the off gases will hardly exceed from 70 to 100° centigrade, so that practically the entire heat developed by the fuel is used up in the burning process proper. Furthermore, the operation of burning cement on a blast grate avoids those heat losses which in well-known processes are due to heating of the furnace (masonry) walls and the like.

In blast processes as practiced hitherto difficulties and failures to secure a proper burning of the cement may also be caused by an "unmixing" or separation of the constituents of the charge, or by an inadequate composition thereof, or by the blast breaking through. With the aid of my invention, these difficulties not only can be eliminated in all cases but also the consumption of fuel is still further reduced and an exceptionally high-grade product is obtained by preparing the charge according to certain special principles or considerations.

In carrying out my invention, the raw materials, the returned treated material and water are mixed together to form a granular mass which retains its character during the entire operation of the blast, so that the distribution of the air blast during its passage through the charge will always remain uniform and such air can not break through the charge at improper points, which breaks would cause irregular sintering. To produce a mixture of this desirable form, I may mix the raw materials in the form of slime with the returned treated material and with the fuel, using about 1 part by weight of raw materials, from about 0.8 to 3 parts by weight of returned treated material, and the corresponding amount of fuel (for instance from about 0.08 to about 0.18 or 0.2 part by weight). The quantity of returned material employed depends on the kind of cement to be produced and on the particular character of the raw comminuted cement material or meal. In this manner I produce a granular mass which will sinter very uniformly on the blast grate, so that the charge will not contain any portions heated either too strongly or too little.

For the purposes of my invention, the term "returned material" or "returned treated material" is to be understood as including not only the fine material which falls through the customary discharge grate of the sintering apparatus and has to be sintered again in any event, but also finished material broken up purposely, that is to say, broken or crushed clinker.

Theoretically it is necessary to admix to the charge such as amount of fuel as not only to obtain a clinker product in a quantity corresponding to the raw powder or meal supplied, but also to have such fuel perform the main portion of the work of expelling carbon dioxide from the weakly burned clinker which is obtained for use as returned material.

In practice, the amount of fuel added to the charge is so proportioned as to produce in all cases a greater amount of well burned clinker than corresponds to the raw powder or meal supplied and greater than the amount to be delivered as the final product. This excess of clinker is admixed to the material to be returned and together with the same reduced to grains of proper size, for instance, about 4 millimeters.

When making Portland cement, the sintering can be obtained in a still more uniform way and the fuel consumption reduced by so adjusting the proportion of raw materials to the returned material in the charge supplied to the sintering apparatus, that for each part by weight of raw materials there will be from about 1.25 to 3 parts by weight of returned material, preferably from about 1.6 to about 2.5 parts by weight. The preferred amount of fuel in this case would be from about 0.1 to about 0.15 part by weight, in grains of less than about 3 millimeters while the returned material would preferably be in grains of less than about 5 millimeters. The smaller proportions of returned material should be used when employing raw materials which sinter readily or contain relatively small amounts of earth alkali carbonates, while the higher proportions of returned material should be used when employing raw materials which sinter less readily or such, (for instance, those rich in earth alkali carbonates) as require a large amount of heat to bring about the chemical conversion of their constituents to form Portland cement. By a few preliminary test runs, it is easy to determine what proportions of returned material (within the limits set forth above) is the best to fit the composition of the raw material in each particular case, and thus the consumption of fuel, per weight unit of the finished clinker, becomes unusually low. The consumption of fuel is, however, increased whenever a departure is made from the optimum proportion of returned material, both when such proportion is exceeded and when a lower proportion is used. The advantages secured by properly proportioning the admixture of returned material according to my invention, will also be secured when the raw materials, in the form of raw powder or meal, are admixed to the blast charge and the amount of moisture required for the preparation of the charge is supplied in some other manner, for instance, by moistening the material to be returned either before or during its mixture with the raw materials.

The consumption of heat is very low in my improved process. I have succeeded, for instance, in producing Portland cement with a heat consumption of from 800 to 1200 calories per kilogram of clinker. Thus with my process a fuel supply of from about 12 to about 20% of the clinker produced will suffice while a rotary furnace for the treatment of a thick slime requires a fuel supply of at least 25% and over. When making, for instance, aluminous cement according to my invention, not more than 800 calories will be required for the production of 1 kilogram of clinker. Furthermore, in the case of my improved process it is not necessary, as with a rotary tubular furnace or kiln, to employ high-grade fuel; on the contrary, I may use quite successfully low-grade fuels producing a large amount of ash, among them for instance bituminous shales, etc. It will, of course, be understood that the ash content of these fuels should be taken into account in connection with the composition of the raw powder or meal.

Preferably all the raw materials are admixed in the form of slime to the returned material and to the fuel. In some cases, however, satisfactory results are obtained even when only a large portion of the raw materials is used in the form of slime, while the remainder is added in a dry condition, for instance, to the mixture of returned material and slime.

In all cases the most appropriate procedure consists in introducing by means of the slimy raw materials all or at least a large portion of the moisture required for the preparation of the mixture. It is important to keep within narrow limits the percentage of moisture required for the mixture in each particular case. This percentage should always be less than about 20% by weight, and in most cases less than from about 8 to about 12% of the weight of the prepared charge (consisting of raw materials, returned material, fuel, and moistening water). Preferably the amount of moisture should be less than about 15% but more than about 6%. Part of this water may also be supplied as a special addition during or after the preparation of the mixture, for instance, if an accurate adjustment of the percentage of moisture is desired. Instead of this, part of the water may be introduced into the mixture with the fuel or with the returned material or with a mixture of both of these substances.

The slimy condition of the raw materials may be obtained in various ways. I may use, for instance, thin or thick slime produced in any well-known manner. Raw materials obtained by the so-called half-wet process are also available. I may also prepare the raw materials by grinding them dry and mix the raw powder or meal with water or aqueous solutions to produce the desired slime.

Assuming, for instance, the use of a thick slime with about 36% by weight of water, containing about 100 parts by weight of dry substance to about 156 parts by weight of slime, the mixture to be charged on the suction grate may for instance be composed as follows:

| | Parts of |
|---|---|
| Thick slime | 156 |
| Returned material | 228 |
| Coke breeze | 12 |

This mixture contains about 14.1% by weight of water. The consumption of fuel amounts to about 18% by weight of the clinker produced.

The returned material is employed in grain sizes below about 10 millimeters and, preferably, under about 6 and even under about 4 millimeters, for instance, from about 0 to about 3 millimeters; this promotes the uniformity of the mixture and the perviousness of the charge to air. The fuel is best used in grains or pieces under about 10 or about 4 millimeters, and preferably even under about 3 millimeters.

The addition of the fuel to the mixture may be effected in different ways. For instance, the fuel may be added to the otherwise complete mixture, so that in the charge of the blast grate the fuel will lie, in the main, between the several grains or particles of the mixture. It is, however, also feasible to incorporate the fuel in the slimy raw materials or in the returned material before or during the mixture. In the latter case especially, the fuel will penetrate into the individual grains or particles of which the mixture is composed. The fuel is distributed rather uniformly in those layers which constitute the surface of the individual grains or particles, thereby insuring an efficient transfer of heat from the burning fuel to the material to be burned.

In some cases, it may be desirable to apply two or more layers on the blast grate, each of these layers containing raw materials, returned material, and fuel in different amounts and proportions (by weight). Since, for instance, when employing a suction blast the lower layers of the charge are preheated more strongly, they may contain a smaller amount of fuel or of returned material, and in this manner a further saving in fuel may be effected.

The height (or depth) of the charge on the grate should not be too great. It is advisable to keep it below about 40 centimeters. The best results as to the high grade of the product and rate of passage of the blast were obtained with charge depths between about 20 and about 30 centimeters. The positive pressure or the negative pressure (suction) causing the combustion air to pass through the charge, likewise is of some importance. When employing a suction blast, it is preferable to use, in the suction boxes situated under the grate, a pressure below atmospheric corresponding to a column of water less than about 120 centimeters in height.

In the accompanying drawing, the receptacles or bins 1 and 3 contain fuel (for instance, coke breeze) and returned material respectively. The receptacle or tank 2 contains cement slime under pressure. Fuel and returned material are delivered in correctly proportioned amounts from the respective bins 1 and 3 upon tables 1' and 3' respectively rotating about vertical axes and depositing these materials upon a feed-screw mechanism 4 located in a suitable trough 4'. The cement slime is sprayed on the fuel and on the returned material conveyed by the screw-mechanism 4, the tank 2 being for this purpose provided with nozzles 2'. The screw mechanism mixes the ingredients thoroughly until the mixture acquires a granular or crumbly form. The fully prepared mixture is discharged by the feed-screw mechanism 4 into the charging bin 5 located above the traveling grate 6. The drawing shows a grate of the type of a Lurgi sintering grate, but I do not wish to restrict myself to this particular type. At 15 I have indicated another bin likewise located above the traveling grate 6. This bin 15 contains broken or crushed clinker, that is to say, "returned material", obtained as explained below. I first apply to the traveling grate 6, from the bin 15, a layer or lining of broken clinker, from about 10 to 20 centimeters high. Upon this layer or lining of clinker material, I then apply a layer of the mixture drawn from the bin 5 giving such layer or charge the height or depth suitable in each particular case. As the upper run of the grate 6 travels toward the right in Fig. 1, it brings the charge under the ignition furnace 7, where the charge is ignited at its surface. At the same time, the fan or other suction apparatus 8 draws air through the charge. The combustion gases issuing from the charge pass into the suction boxes 10 and from them through conduits 9 and the suction apparatus 8 to the stack 16.

The sintering grate 6 is caused to travel at such a rate of speed that the burning operation will have progressed to the grate and will have been completed by the time that the individual sections or units of the grate pass beyond the rear or right-hand edge 10a of the suction box, or of the last suction box, if a plurality of such boxes is used, as shown. At the rear or right hand end of the upper run of the sintering grate 6 the sintered material is thrown off and falls into the crusher 17 in which it is comminuted into pieces of appropriate size. The broken material is delivered to a screening or sifting device 11, which may, for instance, be a vibrating channel or trough. The screens or sieves may, for instance, be of such arrangement and mesh as to separate the broken material into three grain sizes, the first portion having grains of say below from about 6 to about 10 millimeters, the second say between from about 6 to about 10 and from about 20 to about 25 millimeters, and the third say above from about 20 to about 25 millimeters. The portion or grade below say from 6 to 10 millimeters are withdrawn at 14 and returned to the process by suitable conveying mechanism 14' leading to the bin 3. The portion or grade having grains of intermediate size (say between 6 to 10 and 20 to 25 millimeters) is withdrawn at 13 and brought by suitable conveying mechanism 13', to the bin 15, to serve as a lining for the grate 6, as described above. The coarsest portion or grade is delivered to cars 12 or other conveying mechanism by which such portion (constituting the cement product proper) is brought to a place of storage or to a grinding plant, such portion being worked into cement in any well-known or approved manner.

The apparatus for carrying out my improved process is simpler than those used in plants employing rotary tubular furnaces or kilns, in that I am able to dispense with the coal pulverizing mill, the cooling drum, devices for utilizing off gases, etc. The operation may be interrupted whenever desired. Thus there is no objectionable result if the operation is conducted with only one shift a day, or if there are to be intermissions or interruptions of work during the shift. Any waste fuel, for instance, waste coke breeze or slack, may be used as fuel. The fuel need not be ground but if possible the size of its grains should be below about 3 millimeters. Clinkers produced according to my invention (Portland cement clinkers as well as others, for instance, puzzolanic or aluminous cement clinker) are broken or crushed readily.

Repairs such as would correspond to providing new masonry for a rotary tubular cement furnace or kiln, and the enforced idleness of the plant during such repairs, are entirely eliminated in the case of my invention. Supervising the operation is very simple, particularly when the sintering process is conducted with a suction blast. The initial cost of the plant is much lower than that of a rotary tubular furnace plant of the same capacity. My improved process also enables one to adjust the raw cement materials to a low sintering and fusion temperature, or to sinter cements of the type having relatively low fusion points, for instance all kinds of cements rich in iron oxide, such as "Kühl" cement or ferrous aluminous cement.

It is well-known to introduce raw cement-forming powder or meal in granular form into a rotary tubular furnace or kiln. This form is produced by granulating the material in a rotary drum. For instance, dried raw slime (sometimes after grinding it) has been mixed with other raw slime and calcined in a rotary drum and then sintered in a rotary tube. Another well-known process consists in removing water from raw slime, for instance upon filters, and then cutting the material into small pieces of regular shape upon presses which form the material into a band or ribbon. These pieces are rolled in dry powder or meal of raw material and subjected to preliminary burning upon a traveling grate or the like, their sintering being then completed in a rotary tubular furnace or kiln.

Granular material produced according to this well-known process, however, is not suitable for sintering upon a blast grate.

My improved process is always carried out along the general lines indicated above, whether the cement to be produced is a Portland cement of any kind, for instance, white Portland cement, or argillaceous (puzzolanic) cement, or other special cements. The same sintering grate, preferably a suction grate, may be used in the production of all kinds of cement. The basic constituent of the raw cement materials, so far as the lime ingredient is concerned, may be gypsum and/or lime and blast-furnace slag and/or marl. As constituents containing alumina and iron oxide I may use either clay or blast-furnace slag or bauxite or ashes or iron ores and the like, or mixtures of two or more of these substances. In manufacturing Portland cements, argillaceous or puzzolanic and special cements according to my invention, there are, of course, differences in the amount of fuel consumed and in the proportions in which the raw cement materials are mixed with the returned material. These proportions and the amount of fuel must in each case be chosen to suit the particular character of the raw materials.

The aforesaid likewise applies to the manufacture of aluminous cement (bauxite-cement, molten cement).

In carrying the present process into practice, various proportions, raw materials, etc. may be used, but the following illustrative examples will give those skilled in the art a better understanding of the invention when making cements including those referred to hereinabove from various raw materials including those mentioned hereinbefore. In the illustrative examples, the amounts of material will be referred to as parts by weight.

As compared with the hitherto known working methods on sintering grates, as they are e. g., described hereinbefore, my invention has above all the advantage that owing to the use of the initial materials in the form of sludge, further by applying large quantities of return material, and through the intimate mixture of these substances taking place prior to the charge's being fed on to the sintering grate, cements are produced of a high compressive strength, and that in spite thereof the burning of these cements is brought about with such a low fuel consumption as it has never been possible up to the present, and without any dust losses during the burning operation.

EXAMPLE I

I. Fuel—

Coke breeze of 0–3 mm. with a calorific value of 6000 cal_____ 11 parts

II. Cement raw materials—

The cement sludge is made from 60 parts limestone and 40 parts (by weight) blast furnace cinders; the lime being ground in known manner in a wet mill to the usual fineness. (90–95% of the lime sludge passing through a sieve of 4900 mesh/sq. cm.); the blast furnace cinders being ground in dry state to the same fineness.

(a) Contents of lime sludge

| | Parts by weight |
|---|---|
| $SiO_2$ | 0.6 |
| $Al_2O_3 + FeO$ | 0.6 |
| CaO | 32.2 |
| MgO | 1.2 |
| Loss due to burning ($CO_2$) | 25.4 |
| | 60.0   60.0 |
| Water | 40.0   40.0 |

(b) Contents of blast furnace cinders

| | Parts by weight |
|---|---|
| $SiO_2$ | 13.2 |
| $Al_2O_3$ | 5.6 |
| FeO | 0.6 |
| CaO | 17.6 |
| MgO | 1.6 |
| MnO | 0.6 |
| S | 0.8 |
| | 40.0   40.0 |

III. Sinter returns—

| | Parts by weight |
|---|---|
| $SiO_2$ | 30.20 |
| $Al_2O_3$ | 13.50 |
| FeO | 1.33 |
| CaO | 92.10 |
| $CaCO_3$ | 28.62 |
| MgO | 6.20 |
| MnO | 1.33 |
| S | 1.72 |
| | 175   175 |
| | 326 |

Total

| | Percent |
|---|---|
| Fuel | 3.38 |
| Water | 12.22 |
| Cement materials (lime sludge, blast furnace cinders, and sinter returns) | 84.40 |
| | 100 |

The materials are mixed until a granular mass, well permeable to air, is obtained, which is charged on to a sintering grate, previously covered with a 2 cm layer of burnt material of a size ranging between 20 and 5 mm.

| | |
|---|---|
| Temperature of the charge, maximum | 1400–1600° C. |
| Temperature of the waste gases at the beginning | 60° C. |
| Temperature of the waste gases at the end of the burning period | 120° C. |
| Burning period | 6–12 minutes |
| Consumption of air per kg of charged mixture | 3–5 cu. m. |
| Suction draught | 300–400 mm WG |
| Velocity of air in the charge per minute | 180–360 feet |
| Velocity of air in the charge per minute | 60–120 m |
| Thickness of hearth layer | 2–4 cm |
| Thickness of fresh charge | 20–25 cm |

Products

| | Parts by weight |
|---|---|
| Cement clinker, coarse material above 20 mm | 90 |
| Sinter returns, fine material below 5 mm | 150 |
| Hearth layer, medium material between 20–5 mm | 40 |

70 parts from the cement clinker are taken off for the production of cement. The remainder is crushed to 5 mm and used as return material. From the medium material (20–5 mm) only 35 parts by weight are used as hearth layer, the balance is likewise crushed to 5 mm and used as return material.

Analysis of cement clinker

| | Percent |
|---|---|
| $SiO_2$ | 18.50 |
| $Al_2O_3$ | 8.30 |
| FeO | 0.82 |
| CaO | 66.75 |
| MgO | 3.75 |
| MnO | 0.82 |
| S | 1.06 |
| | 100 |

The compressive strengths are as follows:

| | kgs per sq. cm. |
|---|---|
| After 3 days | about 350 |
| After 7 days | do 450 |
| After 28 days | do 600 |

EXAMPLE II

Aluminous cement raw material comprising bauxite and lime

I. Fuel—

| | Parts by weight |
|---|---|
| Coke breeze of 0–3 mm with 15% ashes and a calorific value of 6500 cal | 8.1 |

II. Aluminous cement raw sludge consists of:—

| | Part by weight |
|---|---|
| Bauxite | 1 |
| Lime-stone | 1 | which together are ground in a wet mill to sludge, consisting of (a) *Bauxite*

| | Parts by weight |
|---|---|
| $Al_2O_3$ | 28.51 |
| $Fe_2O_3$ | 7.88 |
| $SiO_2$ | 1.42 |
| CaO | 0.12 |
| $TiO_2$ | 1.61 |
| Loss due to burning | 10.46 |
| | 50 |

(b) *Lime-stone*

| | Parts by weight |
|---|---|
| CaO | 26.8 |
| $SiO_2$ | 0.13 |
| MgO | 0.29 |
| $Fe_2O_3$ | 0.04 |
| Loss due to burning | 22.74 |
| | 50 |

(c) *Water*

| | Parts by weight |
|---|---|
| Water | 21.6 |

III. Sinter returns—

| | Parts by weight |
|---|---|
| $Al_2O_3$ | 28.51 |
| $Fe_2O_3$ | 7.91 |
| $SiO_2$ | 1.56 |
| CaO | 26.92 |
| $TiO_2$ | 1.61 |
| MgO | 0.29 |
| | 66.80 |

Total 196.50

| | Percent |
|---|---|
| Fuel | 4.13 |
| Water | 11.00 |
| Cement materials (bauxite, lime-stone and sinter returns) | 84.87 |
| | 100 |

The mixture and charging of the sintering grate are carried out as per Example I.

| | |
|---|---|
| Temperature of the charge, maximum | 1400–1600° C. |
| Temperature of the waste gases at the beginning | 60° C. |
| Temperature of the waste gases at the end of the burning period | 120° C. |
| Burning period | 6–12 minutes |
| Consumption of air per kg of charged mixture | 3–5 cu. m. |
| Suction draught | 300–400 mm WG |
| Velocity of air in the charge per minute | 180–360 feet |
| Velocity of air in the charge per minute | 60–120 m |
| Thickness of hearth layer | 2–4 cm |
| Thickness of fresh charge | 20–25 cm |

*Products*

| | Parts by weight |
|---|---|
| Cement clinker, coarse material above 25 mm | 80 |
| Sinter returns, fine material below 5 mm | 48.6 |
| Hearth layer, medium material between 5 and 25 mm | 30.0 |

From the cement clinker 66.8 parts are taken off for the production of cement, the remainder being crushed to be used as return material. From the medium material of 5–25 mm 25 parts (by weight) are re-used as hearth layer, the remainder being crushed to be used as return material.

*Analysis of aluminous cement clinker*

| | Per cent |
|---|---|
| $Al_2O_3$ | 42.7 |
| $Fe_2O_3$ | 11.82 |
| $SiO_2$ | 2.34 |
| CaO | 40.30 |
| $TiO_2$ | 2.41 |
| MgO | 0.43 |
| | 100 |

The compressive strengths are as follows:

| | Kgs. per sq. cm |
|---|---|
| After 1 day | above 500 |
| After 3 days | almost 600 |
| After 28 days | about 800 |

EXAMPLE III

The raw materials of a normal Portland cement works, viz., lime, marl, and clay are used as initial materials, which as it is known, are ground to sludge.

I. Fuel—

Coke breeze of 0–3 mm with a calorific value of 6000 cal ____ 12.5 parts by weight II. Cement raw sludge—

*Analysis of dry substance*

| | Per cent |
|---|---|
| $SiO_2$ | 16.00 |
| $Al_2O_3$ | 3.96 |
| $Fe_2O_3$ | 1.57 |
| $CaCO_3$ | 75.24 |
| $MgCO_3$ | 1.15 |
| $CaSO_4$ | 2.08 |
| | 100 |

Water ____ 56 parts by weight ____ 56

Report ____ 168.50

III. Sinter returns—

*Analysis*

| | Per cent |
|---|---|
| $SiO_2$ | 21.90 |
| $Al_2O_3$ | 5.42 |
| $Fe_2O_3$ | 2.15 |
| $CaCO_3$ | 20.80 |
| CaO | 46.14 |
| MgO | 0.74 |
| $CaSO_4$ | 2.85 |
| | 100 |

225

393.50

Total

| | Per cent |
|---|---|
| Fuel | 3.2 |
| Water | 14.2 |
| Cement material (raw sludge and sinter returns) | 82.6 |
| | 100 |

Temperature of the charge, maximum _____ 1400–1600° C.
Temperature of the waste gases at the beginning _____ 60° C.
Temperature of the waste gases at the end of the burning period _____ 120° C.
Burning period _____ 6–12 minutes
Consumption of air per kg of charged mixture _____ 3–5 cu. m.
Suction draught _____ 300–400 mm WG
Velocity of air in the charge per minute _____ 180–360 feet
Velocity of air in the charge per minute _____ 60–120 m
Thickness of hearth layer _____ 2–4 cm
Thickness of fresh charge _____ 20–25 cm.

Products

| | Parts by weight |
|---|---|
| Cement clinker, coarse material above 25 mm | 90 |
| Sinter returns, fine material below 5 mm | 191 |
| Hearth layer, medium material between 5 and 25 mm | 50 |

66.35 parts of the cement clinker are taken off for producing cement, the remainder being crushed to be used as return material. From the medium material between 5 and 25 mm 40 parts (by weight) are re-used as hearth layer, the remainder being crushed to return material.

Analysis of cement clinker

| | Per cent |
|---|---|
| SiO$_2$ | 24.13 |
| Al$_2$O$_3$ | 5.94 |
| Fe$_2$O$_3$ | 2.36 |
| CaO | 63.62 |
| MgO | 0.81 |
| CaSO$_4$ | 3.14 |
| | 100 |

The compressive strengths are as follows:

| | Kgs. per sq. cm. |
|---|---|
| After 3 days | about 350 |
| After 7 days | do 450 |
| After 28 days | do 600 |

EXAMPLE IV

*Initial material:—Gypsum sludge and clay are ground in known manner to sludge*

I. Fuel—(Including reduction coal for the decomposition of gypsum.)

Coke breeze of 0–3 mm. with a calorific value of 6000 cal. with 15% ashes, 14.0 parts by weight.

II. Cement raw sludge—

| | Parts by weight | |
|---|---|---|
| SiO$_2$ | 13.70 | |
| Al$_2$O$_3$ | 4.53 | |
| Fe$_2$O$_3$ | 2.15 | |
| CaSO$_4$ | 104.80 | |
| MgCO$_3$ | 1.31 | |
| Balance (not determined) | 1.31 | |
| | 127.80 | 127.80 |
| Water | 60.00 | 60.00 |

III. Sinter returns—

Analysis

| | Per cent |
|---|---|
| SiO$_2$ | 20.93 |
| Al$_2$O$_3$ | 6.92 |
| Fe$_2$O$_3$ | 3.30 |
| CaO | 65.91 |
| MgO | 0.94 |
| Balance (not determined) | 2.0 |
| | 100 |

250

451.80

Total

| | Per cent |
|---|---|
| Fuel | 3.12 |
| Water | 13.3 |
| Cement material (gypsum, clay and sinter returns) | 83.58 |
| | 100 |

Temperature of the charge, maximum _____ 1400–1600° C.
Temperature of the waste gases at the beginning _____ 60° C.
Temperature of the waste gases at the end of the burning period _____ 120° C.
Burning period _____ 6–12 minutes
Consumption of air per kg. of charged mixture _____ 3–5 cu. m.
Suction draught _____ 300–400 mm. WG.
Velocity of air in the charge per minute _____ 180–360 feet
Velocity of air in the charge per minute _____ 60–120 m.
Thickness of hearth layer _____ 2–4 cm.
Thickness of fresh charge _____ 20–25 cm.

Products

| | Parts by weight |
|---|---|
| Cement clinker, coarse material above 25 mm | 80 |
| Sinter returns, fine material below 5 mm | 231 |
| Hearth layer, medium material between 5 and 25 mm | 40 |

From the cement clinker only 66 parts (by weight) are taken off for the production of cement, the remainder being crushed to return material. From the medium material 35 parts (by weight) are re-used, the remainder after crushing being taken as return material.

Various modifications may be made without departing from the nature of my invention as set forth in the appended claims.

I claim:—

1. The process of producing cement clinker on a blast grate which comprises mixing wet ground raw cement slime, fuel and granular sintered material in such quantity as to produce a substantially granular mixture, placing said mixture on a grate, and igniting said mixture to produce a sintered product.

2. The process of producing cement clinker on a blast grate which comprises mixing wet ground raw cement slime in its original wet form, fuel and granular sintered material in such quantity as to produce a substantially dry granular mixture, placing this granular mixture on a grate, and igniting said mixture to produce a sintered product.

3. The process of producing cement clinker on a blast grate which comprises mixing wet ground raw cement slime, fuel and returned granular sintered material in such quantity that for each part by weight of raw slime there will be about 1.6 to about 2.5 parts by weight of said returned sintered material to provide a substantially dry granular mixture, placing this granular mixture on a grate, and igniting said mixture to provide a sintered product.

4. The process of producing cement clinker on a blast grate which comprises mixing about 1 part by weight of wet ground raw cement slime, about 0.8 to about 3 parts by weight of returned granular sintered material and fuel to produce a substantially granular mixture containing from about 6% to about 15% of moisture, placing said mixture on a blast grate, and sintering said mixture.

5. The process of producing cement clinker on a blast grate which comprises mixing wet ground raw cement material in the form of slime having very fine grain size, sintered material having a grain size substantially larger than said raw cement material and finely subdivided solid fuel to produce a substantially granular mixture wherein the raw cement material and the fuel form substantially a coating on the surface of sintered granules, and sintering said mixture over a blast grate.

6. The process of producing cement clinker on a blast grate which comprises mixing wet ground raw cement material in the form of slime having very fine grain size, sintered material having a grain size substantially larger than said cement material and finely subdivided solid fuel to provide a substantially granular mixture wherein the raw cement material and the fuel form substantially a coating on the surface of the sintered granules, forming a layer of said mixture over a blast grate, igniting said layer, subjecting the ignited layer to an oxidizing blast to form a sintered clinker, crushing said clinkered product to produce a sufficient amount of fines to be returned to form part of said mixtures to be sintered and a sufficient amount of particles having an intermediate fineness to be used as a hearth layer on said grate, and using the coarsest portion of said crushed clinker for the production of cement.

HELMUT WENDEBORN.